(12) United States Patent
Huang (10) Patent No.: US 10,892,654 B2
(45) Date of Patent: Jan. 12, 2021

(54) AXIAL MAGNETIC FIELD MOTOR WITH GRAIN-ORIENTED SILICON STEEL SHEETS

(71) Applicant: Shenzhen Shanxiang Intelligent Technology Enterprise, Shenzhen (CN)

(72) Inventor: Sy-Ruen Huang, Taichung (TW)

(73) Assignee: SHENZHEN SHANXIANG INTELLIGENT TECHNOLOGY ENTERPRISE, Shenzhen (CN)

( * ) Notice: Subject to any disclaimer, the term of this patent is extended or adjusted under 35 U.S.C. 154(b) by 259 days.

(21) Appl. No.: 16/185,603

(22) Filed: Nov. 9, 2018

(65) Prior Publication Data

US 2020/0153293 A1 May 14, 2020

(51) Int. Cl.
*H02K 1/27* (2006.01)
*H02K 15/03* (2006.01)
*H02K 1/28* (2006.01)
*H02K 1/18* (2006.01)

(52) U.S. Cl.
CPC ............ *H02K 1/276* (2013.01); *H02K 1/182* (2013.01); *H02K 1/2793* (2013.01); *H02K 1/28* (2013.01); *H02K 15/03* (2013.01)

(58) Field of Classification Search
CPC .............................. H02K 1/2793; H02K 1/182
See application file for complete search history.

(56) References Cited

U.S. PATENT DOCUMENTS

| | | | | |
|---|---|---|---|---|
| 5,646,467 | A * | 7/1997 | Floresta | H02K 1/17 310/154.05 |
| 7,323,801 | B2 * | 1/2008 | Kojima | H02K 1/14 310/261.1 |
| 8,106,548 | B2 * | 1/2012 | Takeuchi | H02K 21/02 310/68 B |
| 8,624,456 | B2 * | 1/2014 | Lamperth | H02K 1/2793 310/156.31 |
| 8,736,135 | B2 * | 5/2014 | Asano | H02K 1/148 310/216.058 |
| 9,160,219 | B2 * | 10/2015 | Takamatsu | H02K 1/02 |
| 9,608,484 | B2 * | 3/2017 | Cho | H02K 1/2793 |
| 9,935,510 | B2 * | 4/2018 | Tokoi | H02K 1/2793 |
| 9,998,062 | B2 * | 6/2018 | Nadarajan | H02K 21/026 |
| 10,122,223 | B2 * | 11/2018 | Takezaki | H02K 1/27 |
| 10,454,403 | B2 * | 10/2019 | King | H02K 11/215 |
| 10,461,614 | B2 * | 10/2019 | Dajaku | H02K 1/2713 |
| 10,523,100 | B2 * | 12/2019 | Tokoi | H02K 21/24 |
| 10,554,082 | B2 * | 2/2020 | Watanabe | H02K 1/02 |
| 10,693,331 | B2 * | 6/2020 | Lindner | H02K 1/2713 |
| 10,700,562 | B2 * | 6/2020 | Chen | H02P 21/00 |

(Continued)

*Primary Examiner* — Robert W Horn
(74) *Attorney, Agent, or Firm* — Mayer & Williams PC (57) ABSTRACT

An axial magnetic field motor with grain-oriented silicon steel sheets includes a rotating shaft; a stator including two bases and multiple electromagnetic elements constituted by cores and windings; and two rotors disposed outside the stators, wherein each of the rotors is constituted by magnetic-conducting sheets and permanent magnets, each of the magnets has one side being an N pole and the other side being an S pole, adjacent two of the magnets are disposed with the same poles adjacent to each other, and the permanent magnets on the rotor are disposed in a circumferential direction with the magnetic poles facing each other.

7 Claims, 7 Drawing Sheets

(56) References Cited

U.S. PATENT DOCUMENTS

| | | | | |
|---|---|---|---|---|
| 2010/0148611 A1* | 6/2010 | Wang | ............ | H02K 21/24 |
| | | | | 310/156.37 |
| 2012/0139379 A1* | 6/2012 | Ge | ............ | H02K 21/12 |
| | | | | 310/156.36 |
| 2012/0146445 A1* | 6/2012 | Tokoi | ............ | H02K 21/026 |
| | | | | 310/156.37 |
| 2013/0313932 A1* | 11/2013 | Shibata | ............ | H02K 1/2706 |
| | | | | 310/156.07 |
| 2014/0361646 A1* | 12/2014 | Saito | ............ | B60L 15/20 |
| | | | | 310/51 |
| 2016/0268866 A1* | 9/2016 | Matsumoto | ............ | H02K 15/022 |
| 2017/0012480 A1* | 1/2017 | Woolmer | ............ | H02K 9/19 |
| 2017/0025927 A1* | 1/2017 | Weerts | ............ | H02K 21/24 |
| 2017/0054336 A1* | 2/2017 | Takezaki | ............ | H02K 1/2793 |
| 2017/0163112 A1* | 6/2017 | Tokoi | ............ | H02K 3/18 |
| 2019/0013707 A1* | 1/2019 | Mihaila | ............ | H02K 21/24 |
| 2019/0103791 A1* | 4/2019 | Goel | ............ | H02K 1/272 |
| 2019/0173342 A1* | 6/2019 | Chmelicek | ............ | H02K 1/2713 |
| 2019/0245418 A1* | 8/2019 | Takahashi | ............ | H02K 1/182 |
| 2019/0305628 A1* | 10/2019 | Yamazaki | ............ | H02K 1/146 |
| 2019/0305638 A1* | 10/2019 | Chi-Hsueh | ............ | H02K 1/2793 |
| 2019/0386549 A1* | 12/2019 | Prieto | ............ | H02K 1/2793 |
| 2020/0059139 A1* | 2/2020 | Li | ............ | H02K 15/0006 |
| 2020/0067356 A1* | 2/2020 | Post | ............ | H02K 15/10 |
| 2020/0153293 A1* | 5/2020 | Huang | ............ | H02K 1/276 |

* cited by examiner

AXIAL MAGNETIC FIELD MOTOR WITH GRAIN-ORIENTED SILICON STEEL SHEETS

BACKGROUND OF THE INVENTION

Field of the Invention

The invention relates to the technical field of electromechanical transmission, and more particularly to an axial magnetic field motor with grain-oriented silicon steel sheets.

Description of the Prior Art

At present, the technological key of the motor applied to the electric vehicle and the electric aircraft is directed to the high specific power and the high output power. The existing conventional motor has the very low power density in the high power condition due to the structural limitation, and cannot satisfy the requirements of the electric vehicle and the electric aircraft on the very high power density. Among all motors, the permanent magnet motor has the highest efficiency. This is because that the excitation adopts the permanent magnet body without power consumption. The magnetic flux density thereof is high, so that the high torque can be obtained, and the motor can be made to have the small volume and the light weight.

Typically, the permanent magnet motor may be axial or radial. An axial flux permanent magnet (AFPM) motor is better than a conventional radial flux permanent magnet motor in the advantages including the high torque-to-weight ratio, the high efficiency, the adjustable air gap, the balanced attraction force between the rotor and the stator and the better heat removal rate. They can be mounted on the wheel simply and compactly, and are very suitable for the hub, and can be applied to the direct drive application.

The axial magnetic field motor is also referred to as a "disc motor," which is a motor having a main magnetic field in a direction of a rotating shaft. The axial magnetic field motor is different from the ordinary motor, and has an axial magnetic flux direction, the conductor for carrying the current is placed radially, and the stator core and the rotor core have the disc structures. The axial flux motor has the specific positioning of the magnetic bodies, and these magnetic bodies are disposed on a plane parallel to the coil.

The existing axial flux permanent magnet motor may be one-sided or double-sided, may have one or no armature slot, may have one or no armature core, may have a rotor with internal or external permanent magnets, may have surface mounted or internal permanent magnets, and may have one single stage or multiple stages.

The double-sided salient pole has an external stator or an external rotor. The external stator means the fewer permanent magnet bodies, but the use of the windings is poor. The external rotor is known as particularly advantageous to the machine topology. The topology of the double-sided axial flux permanent magnet motor is a one-stator-two-rotor (annular surface) and a two-stator-one-rotor, that is, an axial flux internal rotor (AFIR).

FIGS. 7(a) to 7(d) are schematic views showing existing axial flux paths and distributions, wherein symbol 100 denotes a stator, symbol 200 denotes a rotor, and symbol 300 denotes a magnet.

Figure 7A:
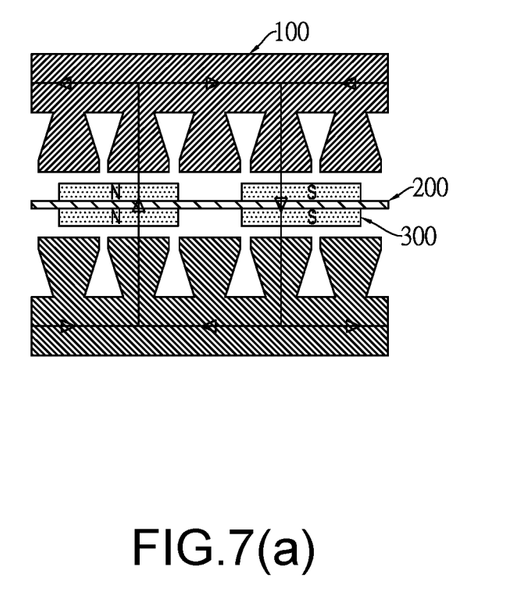
FIGS. 7(a) to 7(d) are schematic views showing various axial flux paths and distributions of the prior art.
Figure 7B:
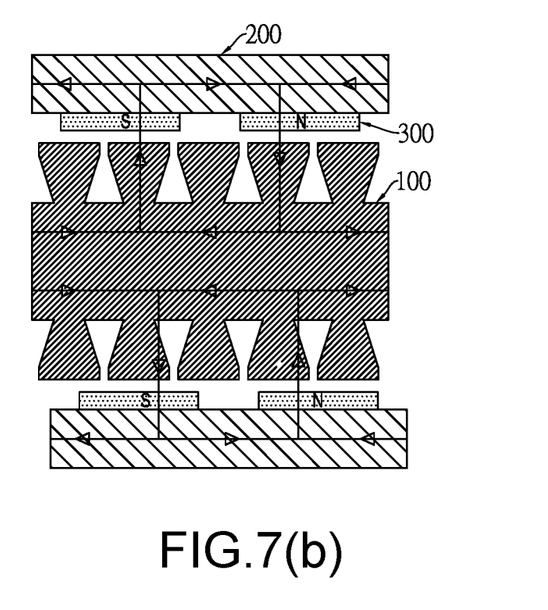
Figure 7C:
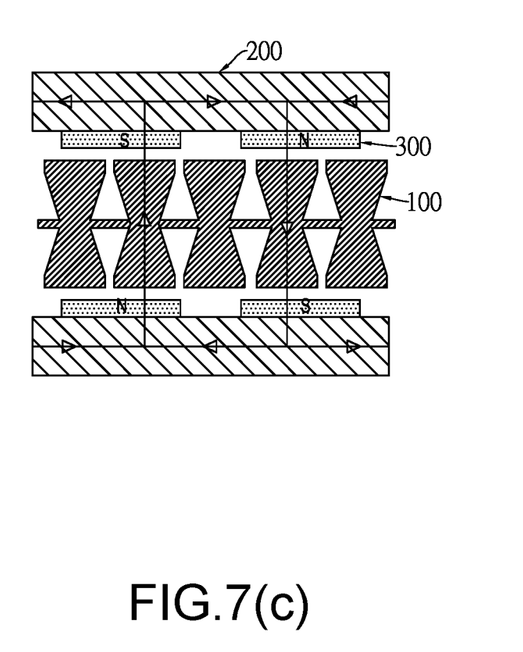
Figure 7D:
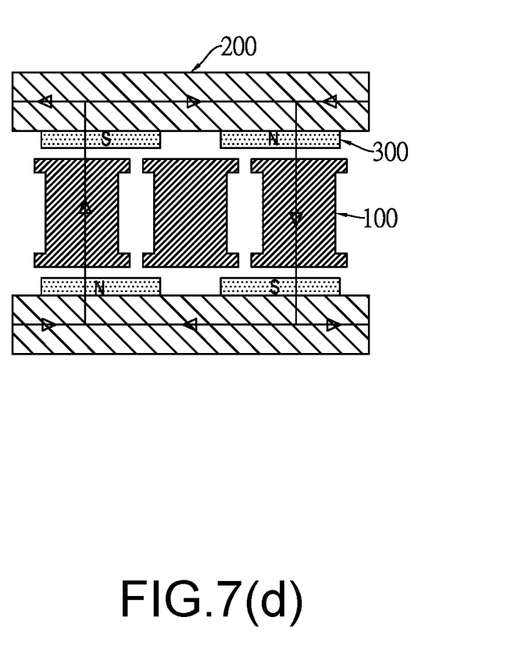

The double-sided topology includes four types: an axial flux internal rotor (AFIR) in FIG. 7(a); a toroidally wound internal stator (TORUS) in FIG. 7(b); an axial flux internal stator (AFIS) in FIG. 7(c); and a yokeless and segmented armature (YASA) in FIG. 7(d). According to the schematic views of FIGS. 7(a) to 7(d) showing the individual magnetic flux paths and distributions of the main portions, it is obtained that the yokes of the permanent magnets of the rotor need to be orientated. Meanwhile, the stator core further needs to be orientated.

SUMMARY OF THE INVENTION

A main objective of the invention is to provide a design structure, in which multiple grain-oriented silicon steel sheets constitute a longitudinal core and grain-oriented silicon steel sheets on two ends thereof are stacked to constitute a disc-shaped base to constitute a stator, and permanent magnets are embedded into the magnetic-conducting sheets (grain-oriented silicon steel sheets) to form a rotor, so that the magnetoresistance of the magnetic circuit is reduced, and the eddy current effect is reduced. Meanwhile, the volume of the core can be reduced, and the overall weight can be reduced.

To achieve the above-identified objective, the invention adopts the following technical solutions.

An axial magnetic field motor with grain-oriented silicon steel sheets includes a rotating shaft; a stator mounted on the rotating shaft and including two bases and multiple electromagnetic elements, wherein each of the bases is constituted by multiple grain-oriented silicon steel sheets stacked to form a disc shape, multiple through holes are annularly and separately formed on the base, and the multiple electromagnetic elements are constituted by longitudinal cores constituted by multiple grain-oriented silicon steel sheets, and windings wound around outer peripheral surfaces of the cores, wherein two ends of each of the cores are provided with fixing portions, which correspond to dimensions of the through holes of the base, and can be fit within the through holes of the base; and two rotors, wherein the rotating shaft passes through the two rotors disposed on two sides of the stator, each of the rotors is constituted by two magnetic-conducting sheets and multiple permanent magnets, each of the magnetic-conducting sheets is formed with multiple equally-spaced through holes on an annular circumferential surface, the permanent magnets are embedded into the through holes, each of the permanent magnets has a fan shape, one side of the fan-shaped permanent magnet is an N pole, the other side of the fan-shaped permanent magnet is an S pole, adjacent two of the permanent magnets have the same N and N poles or the same S and S poles disposed in a circumferential direction, and the permanent magnets on the magnetic-conducting sheets in the rotors on two sides of the stator are disposed with different magnetic poles (N and S on one side; and S and N on the other side) facing each other. Thus, when the windings of the cores are powered on, the cores and the bases of the disc-shaped grain-oriented silicon steel sheets on two ends thereof as well as the permanent magnets on two sides form a complete magnetic circuit to reduce the magnetoresistance of the magnetic circuit and achieve the effect of decreasing the eddy current. Meanwhile, the volume of the core can be reduced, and the overall weight can be reduced.

In the above-mentioned axial magnetic field motor with the grain-oriented silicon steel sheets, the permanent magnet has a width L, a gap between the two adjacent permanent magnets is ΔL, and the core has a width L1 equal to one half of the width of the permanent magnet plus the gap between the two adjacent permanent magnets, where L1=(L/2)+ΔL.

In the above-mentioned axial magnetic field motor with the grain-oriented silicon steel sheets, each of the cores in the stator, the two disc-shaped bases and the two disc-shaped magnetic-conducting sheets is made of grain-oriented silicon steel sheets (also referred to as single oriented silicon steel sheets or oriented silicon steel sheets) having grain orientations in a rolling direction, grain-oriented iron powder or an oriented magnetic conductor.

In the above-mentioned axial magnetic field motor with the grain-oriented silicon steel sheets, the cores in the stator are parallel to a center of the rotating shaft, and are axially and equally-spaced distributed on an inner circumference of the disc-shaped base constituted by two grain-oriented silicon steel sheets stacked together along the rotating shaft.

In the above-mentioned axial magnetic field motor with the grain-oriented silicon steel sheets, the longitudinal core may have a square shape, a rectangular shape or a round shape.

The invention has the following advantages.

(1) The invention uses the core constituted by multiple grain-oriented silicon steel sheets stacked together. When the windings of the cores are powered on, the cores and the bases of the disc-shaped grain-oriented silicon steel sheets on two ends thereof as well as the permanent magnets on two sides can form the complete magnetic circuit to reduce the magnetoresistance of the magnetic circuit and achieve the effect of decreasing the eddy current. Meanwhile, the volume of the core can be reduced, and the overall weight can be reduced.

(2) The invention uses multiple grain-oriented silicon steel sheets on two ends of the core and stacked together to constitute the disc-shaped base as the base of the magnetic yoke, so that the magnetic circuit loss can be decreased.

(3) The rotors of the invention are two round-shaped magnetic-conducting sheets disposed opposite each other. The magnetic-conducting sheet is constituted by multiple grain-oriented silicon steel sheets stacked together to provide the magnetic-conducting permanent magnets. The multiple permanent magnets are embedded into the magnetic-conducting sheets. Each of the permanent magnets has a fan shape, one side of the fan-shaped permanent magnet is an N pole, the other side of the fan-shaped permanent magnet is an S pole, and adjacent two of the permanent magnets have the same N and N poles or the same S and S poles disposed in a circumferential direction. The permanent magnets on the magnetic-conducting sheets on two sides of the stator are disposed with different magnetic poles (N and S on one side, and S and N on the other side) facing each other. So, the permanent magnets rotated to any position can just correspond to the cores, and the cores respectively approach the N and S poles, so that the corresponding permanent magnets of the magnetic-conducting sheets on two sides just mutually repulse, so that the mutual corresponding permanent magnets of the two rotors of the magnetic-conducting sheets disposed opposite to each other just mutually repulse. Thus, the magnetic flux passing through the core and the base disposed thereinside constitute a complete magnetic circuit. That is, the N and S poles can constitute a complete magnetic circuit through the base in the rotor.

BRIEF DESCRIPTION OF THE DRAWINGS

FIG. 6 is a schematic view showing magnetic flux directions when windings of the invention are powered on.

DETAILED DESCRIPTION OF THE PREFERRED EMBODIMENTS

Soft magnetic materials commonly used in the industry are mainly electromagnetic steel sheets, and are generally known as silicon steel sheets. The silicon steel is classified into grain-oriented and grain non-oriented types according to the grain crystallization direction. The grain-oriented silicon steel is known as a cold rolled grain-oriented steel (CRGO), and the silicon content is about 3.2%. A special rolling method is used to control the arrangement direction of crystallization, so that the best soft magnetic property is obtained along the rolling direction, and the magnetic flux density thereof can be increased by 30% in the rolling direction. This is mainly applied to the product, such as the high efficiency transformer and the electric motor. The non-grain-oriented silicon steel is typically known as a cold rolled non-grain-oriented steel (CRNGO), and contains 2 to 3.5% of silicon, has isotropic magnetic properties in various directions, is made of the material cheaper than the grain-oriented silicon steel, and is applied to the motor and generator with the changing magnetic flux direction and the product whose efficiency becomes less important.

Firstly, it is to be described that in the following specification of the invention, the grain-oriented silicon steel sheet represents the silicon steel sheet, in which the grain orientation is along the rolling direction, and is also known as the single oriented silicon steel sheet, directional silicon steel sheet or oriented silicon steel sheet.

In this specification, the term of "grain-oriented silicon steel sheet" represents the silicon steel sheet, in which the grain orientation is along the rolling direction.

Figure 1:
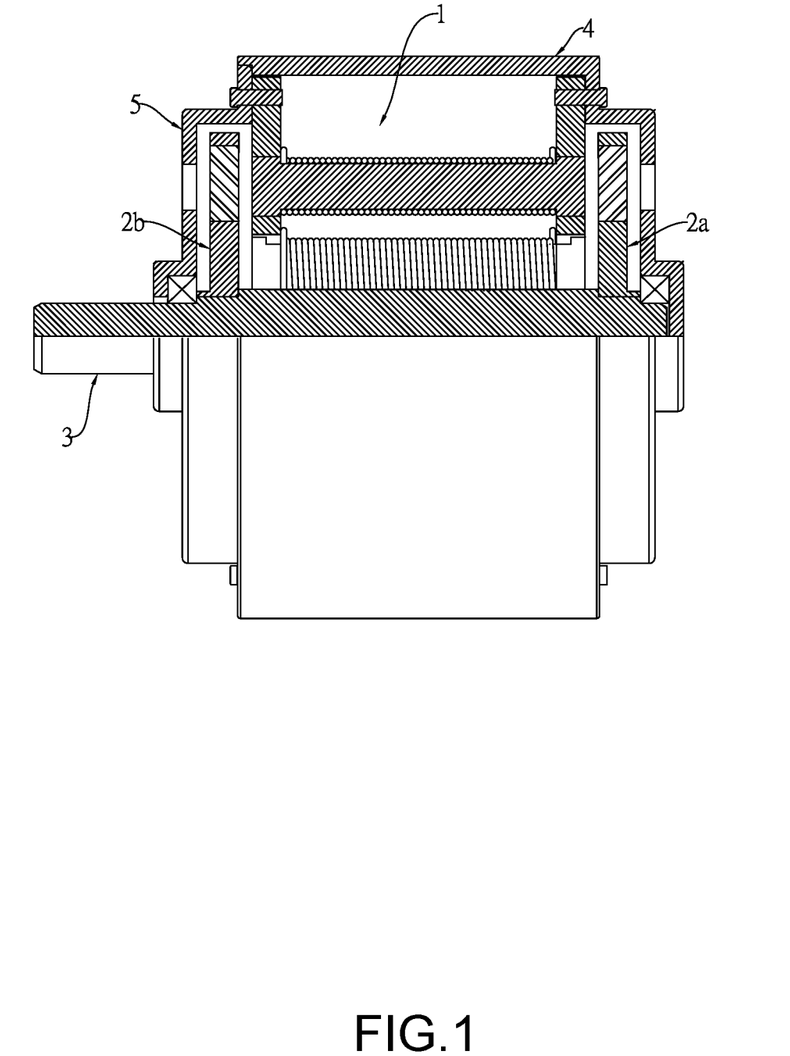
FIG. 1 is a partially assembled schematic cross-sectional view showing an axial magnetic field motor having grain-oriented silicon steel sheets according to the invention.
Figure 2:
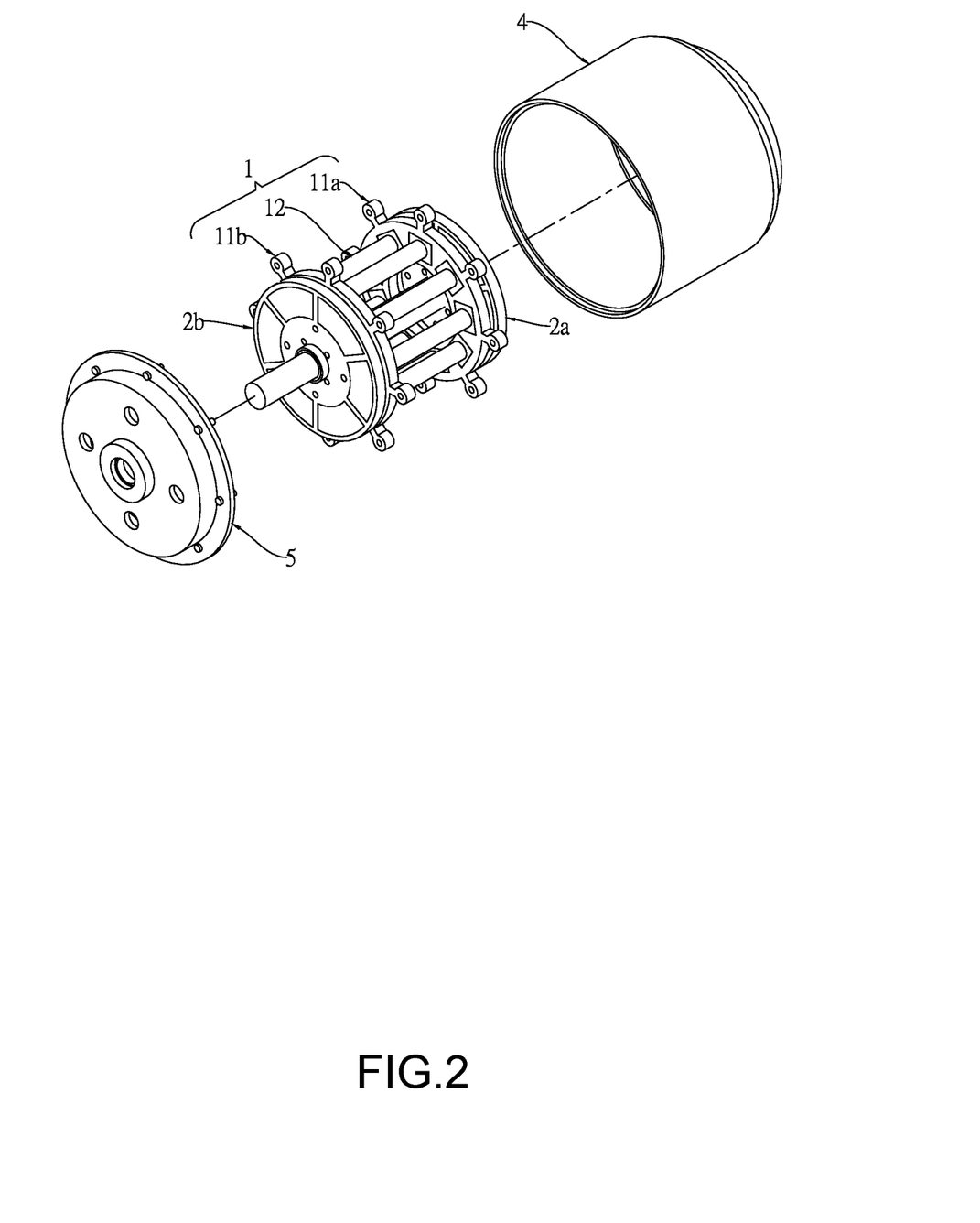
FIG. 2 is a partially pictorially schematic decomposed view showing the invention.

Referring to FIGS. 1 and 2, an axial magnetic field motor with grain-oriented silicon steel sheets according to the invention includes a stator 1, two rotors 2a and 2b disposed outside the stator 1, a rotating shaft 3 mounted on the centers of the two rotors 2a and 2b, a seat 4 mounted outside the stator 1, and an upper cover 5 mounted on an opening of the seat 4.

Figure 3:
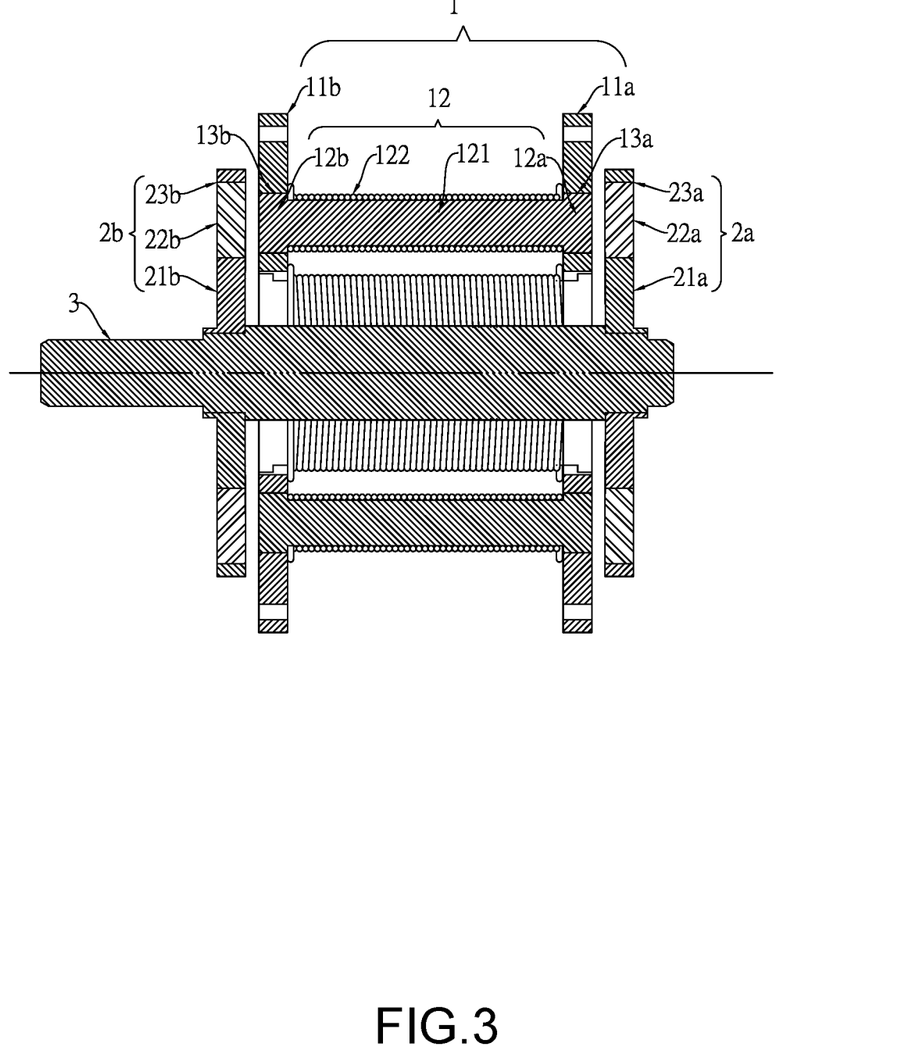
FIG. 3 is a schematically assembled cross-sectional view showing a stator and a rotor of the invention.
Figure 4:
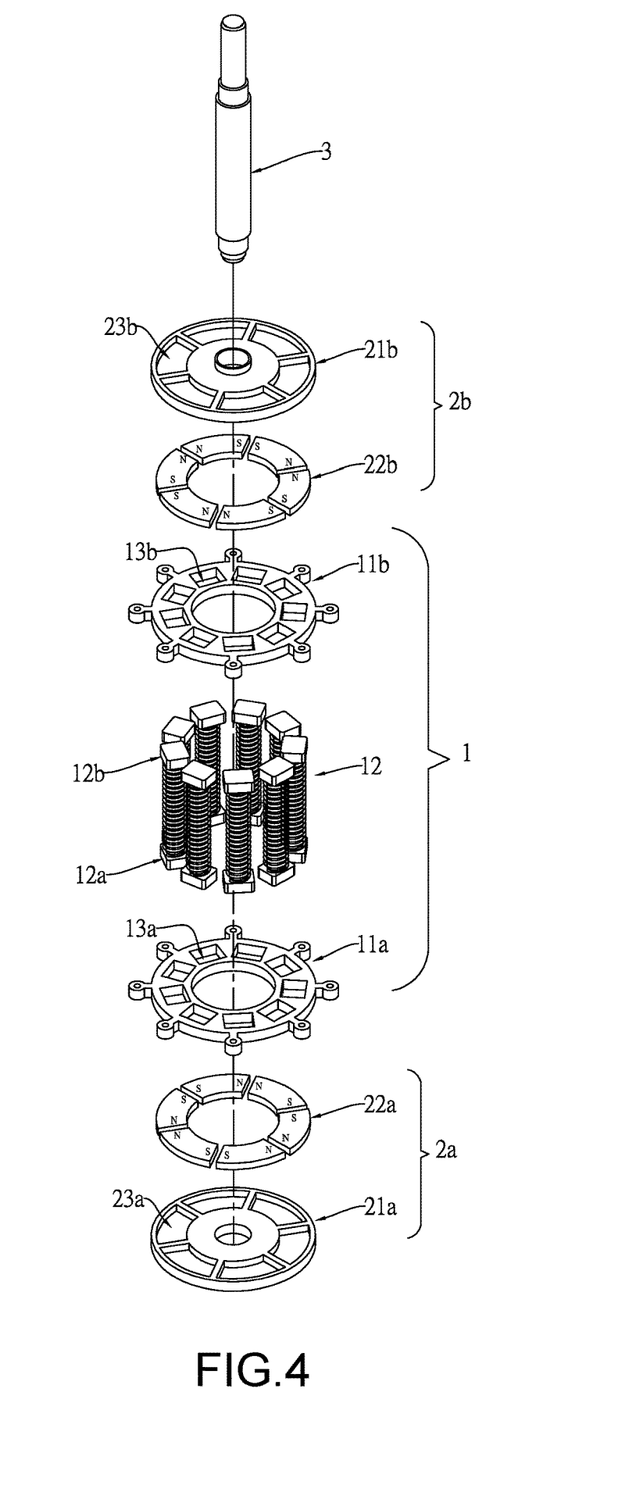
FIG. 4 is a decomposed schematic view of FIG. 3.

Referring further to FIGS. 3 and 4, the stator 1 includes two disc-shaped bases 11a and 11b and multiple electromagnetic elements 12. The bases 11a and 11b are formed by stacking multiple grain-oriented silicon steel sheets to constitute magnetic yokes, and multiple through holes 13a and 13b are annularly and separately formed on the bases 11a and 11b. The electromagnetic element 12 includes a longitudinal core 121 constituted by multiple grain-oriented silicon steel sheets, and a winding 122 wound around an outer peripheral surface of the core 121. Two ends of the core 121 are provided with rectangular fixing portions 12a and 12b corresponding to the dimensions of the through holes 13a and 13b of the bases 11a and 11b. The fixing portions 12a and 12b may be fit within the through holes 13a and 13b of the two bases 11a and 11b. In the drawing of this embodiment, the core 121 is round or circular. When the invention is implemented, the core may have the square shape, rectangular shape, round shape or any other shape, around which the coil can be easily wound, and this invention is not restricted to the longitudinal round shape.

Figure 5A:
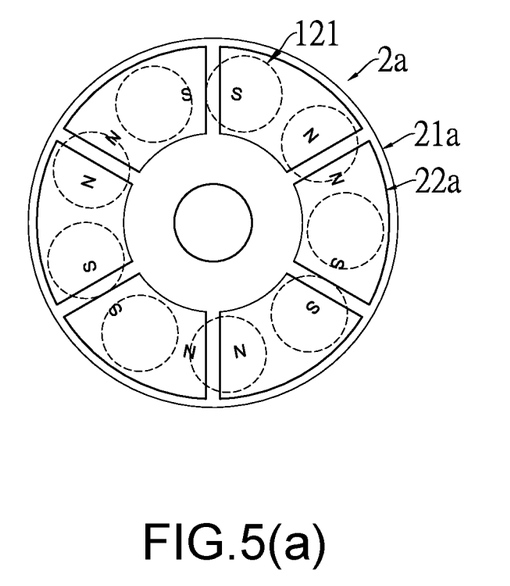
FIGS. 5(a) and 5(b) are schematic views showing arrangements of magnetic poles of permanent magnets of the rotor of the invention.
Figure 5B:
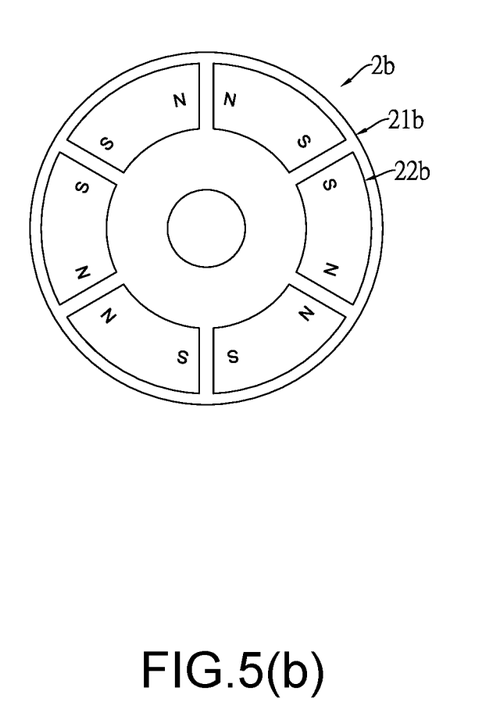
Figure 6:
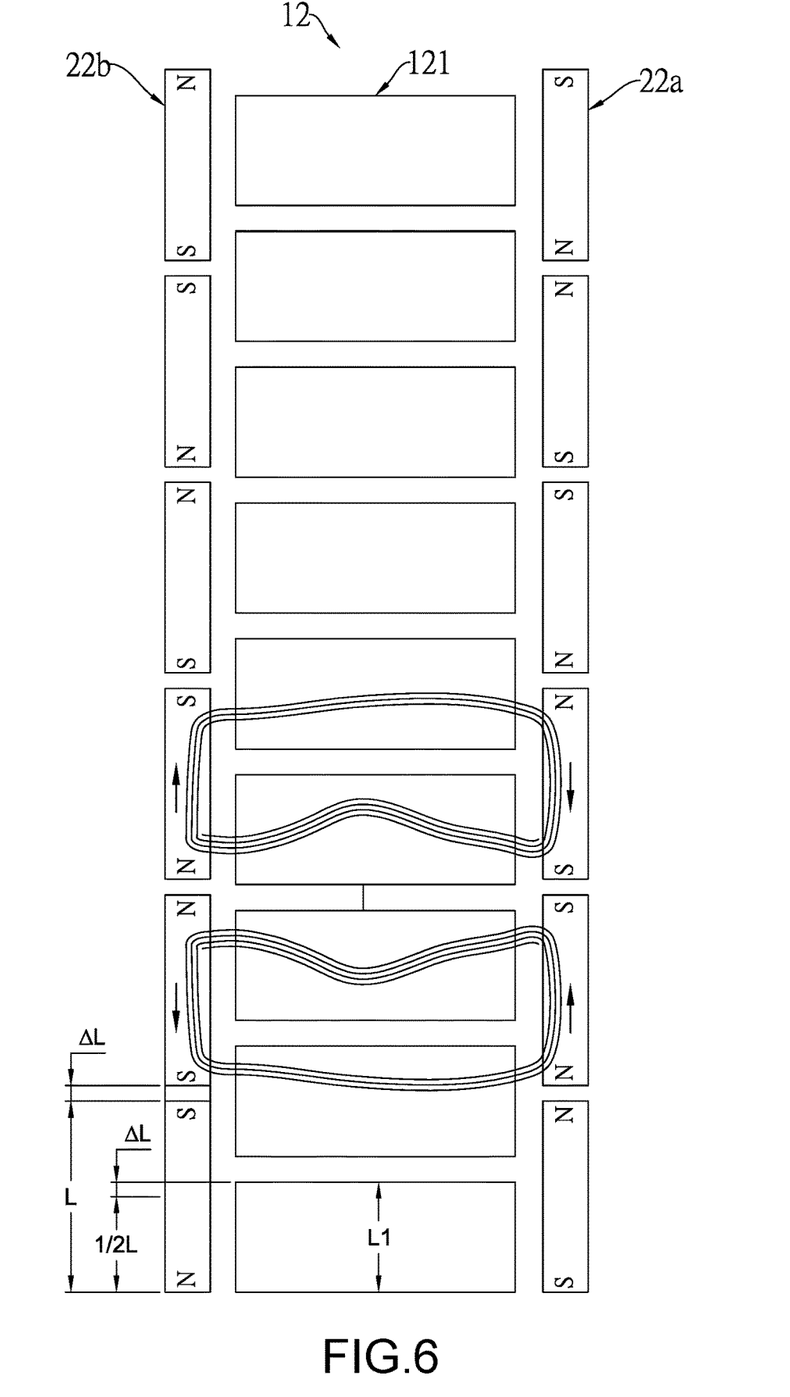

Referring further to FIGS. 3 and 4, the rotating shaft 3 passes through the two rotors 2a and 2b disposed outside the bases 11a and 11b of the stator 1. Each of the rotors 2a and 2b includes magnetic-conducting sheets 21a and 21b and multiple permanent magnets 22a and 22b. The magnetic-conducting sheets 21a and 21b are constituted by multiple grain-oriented silicon steel sheets stacked to form round shapes. An annular circumferential surface of each of the magnetic-conducting sheets 21a and 21b is formed with multiple equally-spaced through holes 23a and 23b. The permanent magnets 22a are embedded into the through holes 23a and 23b of the magnetic-conducting sheets 21a and 21b. Referring also to FIGS. 5(a), 5(b) and 6, each of the permanent magnets 22a and 22b has a fan shape, one side of the fan-shaped permanent magnet is an N pole, the other side of the fan-shaped permanent magnet is an S pole, adjacent two of the permanent magnets have the same N and N poles or the same S and S poles disposed in a circumferential direction, and the permanent magnets on the magnetic-conducting sheets in the rotors 2a and 2b on two sides are disposed with different magnetic poles facing each other (N and S on one side; and S and N on the other side).

Referring further to FIGS. 3 and 6, the invention utilizes the structural design, in which the core 121 has the grain-oriented silicon steel sheets, the bases 11a and 11b of magnetic yokes of the disc-shaped grain-oriented silicon steel sheets on two ends are provided, and the magnetic-conducting sheets 21a and 21b of the magnetic-conducting grain-oriented silicon steel sheets are embedded with the permanent magnets 22a and 22b. When the winding 122 of the core 121 is powered on, every two of the cores 121 and the bases 11a and 11b of the magnetic yokes of the disc-shaped grain-oriented silicon steel sheets on two ends thereof as well as the permanent magnets 22a and 22b on two sides form a complete magnetic circuit, as shown in FIG. 6, and the effect of reducing the eddy current can be achieved. Meanwhile, the volume of the core can be reduced, and the overall weight can be reduced.

In the axial magnetic field motor with the grain-oriented silicon steel sheets according to the invention, the rolling direction is controlled, and the grain-oriented silicon steel sheets having the Gaussian texture (i.e., having the grain oriented tissue of the [110] crystal plane and [100] crystal orientation) manufactured by the recrystallization technology are adopted. The grain-oriented silicon steel sheet is a silicon steel sheet formed after being specially processed, and can make the magnetoresistance become small and the magnetic permeability become good when the line of magnetic force passes along the rolling direction. The core is made of the grain-oriented silicon steel sheets, so that the volume of the core is reduced, and the weight is thus decreased.

As shown in FIG. 6 of the invention, two magnetic poles N and S of each of the permanent magnets disposed in the magnetic-conducting sheets 21a and 21b are arranged with N and N poles being near each other, or with S and S poles being near each other. In addition, the permanent magnets of the magnetic-conducting sheets 21a and 21b of the rotors 2a and 2b on two sides are disposed with different magnetic poles (N and S one side; and S and N on the other side) facing each other.

In addition, the cores 121 in the stator 1 are constituted by multiple grain-oriented silicon steel sheets to decrease the eddy current effect, and are commonly held by the bases 11a and 11b of the disc-shaped magnetic yokes constituted by one grain-oriented silicon steel sheet.

When the invention is implemented, the core 121 may be formed by die casting the grain-oriented iron powder, or another oriented magnetic conductor may function as the core without hindrance to the implementation of this invention.

As shown in FIGS. 4 to 6, the multiple cores 121 of the invention are parallel to the center of the rotating shaft 3, and are axially and equally-spaced distributed on the inner circumferences of the disc-shaped bases 11a and 11b constituted by the two grain-oriented silicon steel sheets stacked together along the rotating shaft 3. Each of the permanent magnets in each of the magnetic-conducting sheets 21a and 21b has a width L. A gap between the two adjacent permanent magnets is ΔL. The width L1 of the core is equal to one half of the width of the permanent magnet (L/2) plus the gap (ΔL) between the two adjacent permanent magnets, where L1=(L/2)+ΔL, as shown in FIG. 6. In the magnetic-conducting sheets 21a and 21b of this embodiment, there are six permanent magnets, there are nine electromagnetic elements 12, and the number (b) of the electromagnetic elements 12 is divisible by 3. In addition, in each magnetic-conducting sheets 21a and 21b, the number (a) of the permanent magnets divided the number (b) of the electromagnetic elements 12 is smaller than or equal to 1.1 (a/b≤1.1), as shown in FIG. 6.

Because the cores 121 are uniformly disposed, the permanent magnets 22a and 22b rotated to any position can just correspond to the cores 121, and the cores 121 respectively approach the N and S poles, so that the corresponding permanent magnets of the magnetic-conducting sheets 21a and 21b on two sides just mutually repulse, and a complete magnetic circuit can be constituted by the magnetic flux passing through the core 121 at this place, and the magnetic yokes of the disc-shaped bases 11a and 11b on two ends of the core 121 thereinside. That is, the magnetic poles (N and S poles) can constitute one complete magnetic circuit through the magnetic yokes of the disc-shaped bases 11a and 11b on two ends of the core 121.

New characteristics and advantages of the invention covered by this document have been set forth in the foregoing description. It is to be expressly understood, however, that the drawings are for the purpose of illustration only and are not intended as a definition of the limits of the invention. Changes in methods, shapes, structures or devices may be made in details without exceeding the scope of the invention by those who are skilled in the art. The scope of the invention is, of course, defined in the language in which the appended claims are expressed.

What is claimed is:

1. An axial magnetic field motor, comprising:
    a rotating shaft;
    a stator mounted on the rotating shaft, the stator comprising two bases and multiple electromagnetic elements, wherein each of the bases is constituted by multiple grain-oriented silicon steel sheets stacked to form a disc shape, multiple through holes are annularly and separately formed on the base, and the multiple electromagnetic elements are constituted by longitudinal cores constituted by multiple grain-oriented silicon steel sheets, and windings wound around outer peripheral surfaces of the cores, wherein two ends of each of the cores are provided with fixing portions, which correspond to dimensions of the through holes of the base, and can be fit within the through holes of the base; and
    two rotors, wherein the rotating shaft passes through the two rotors disposed outside the stator, each of the rotors is constituted by two magnetic-conducting sheets and multiple permanent magnets, each of the magnetic-conducting sheets is formed with multiple equally-spaced through holes on an annular circumferential surface, the permanent magnets are embedded into the through holes, each of the permanent magnets has a fan shape, one side of the fan-shaped permanent magnet is an N pole, the other side of the fan-shaped permanent magnet is an S pole, adjacent two of the permanent magnets have the same N and N poles or the same S and S poles disposed in a circumferential direction, and the permanent magnets on the magnetic-conducting sheets in the rotors on two sides are disposed with different magnetic poles facing each other.

2. The axial magnetic field motor according to claim 1, characterized in that the permanent magnet has a width L, a gap between the two adjacent permanent magnets is ΔL, and the core has a width L1 equal to one half of the width of the permanent magnet plus the gap between the two adjacent permanent magnets, where L1=(L/2)+ΔL.

3. The axial magnetic field motor according to claim 1, characterized in that the core in the stator is made of grain-oriented silicon steel sheets having grain orientations along a rolling direction, grain-oriented iron powder or oriented magnetic conductors.

4. The axial magnetic field motor according to claim 1, characterized in that the cores in the stator are parallel to a center of the rotating shaft, and are axially and equally-spaced distributed on an inner circumference of the disc-shaped base constituted by two grain-oriented silicon steel sheets stacked together along the rotating shaft.

5. The axial magnetic field motor according to claim 1, characterized in that the two disc-shaped bases in the stator are made of grain-oriented silicon steel sheets having grain orientations along a rolling direction, grain-oriented iron powder or oriented magnetic conductors.

6. The axial magnetic field motor according to claim 1, characterized in that two round-shaped magnetic-conducting sheets in the rotor are made of grain-oriented silicon steel sheets having grain orientations along a rolling direction, grain-oriented iron powder or oriented magnetic conductors.

7. The axial magnetic field motor according to claim 1, characterized in that the longitudinal core has a square shape, a rectangular shape or a round shape.

* * * * *